United States Patent
Kirjasniemi et al.

(10) Patent No.: US 6,416,632 B1
(45) Date of Patent: Jul. 9, 2002

(54) APPARATUS FOR DEGASSING AN AQUEOUS SUSPENSION CONTAINING PULP FIBERS

(75) Inventors: Jaakko Kirjasniemi; Antti Suonperä, both of Jyväskylä (FI)

(73) Assignee: Metso Paper, Inc., Helsinki (FI)

( * ) Notice: Subject to any disclaimer, the term of this patent is extended or adjusted under 35 U.S.C. 154(b) by 0 days.

(21) Appl. No.: 09/601,308

(22) PCT Filed: Jan. 28, 1999

(86) PCT No.: PCT/FI99/00058

§ 371 (c)(1),
(2), (4) Date: Sep. 11, 2000

(87) PCT Pub. No.: WO99/39047

PCT Pub. Date: Aug. 5, 1999

(30) Foreign Application Priority Data

Jan. 30, 1998 (FI) .................................................. 980220

(51) Int. Cl.[7] .............................. D21D 5/26; B01D 19/00
(52) U.S. Cl. .......................... 162/380; 162/264; 96/182; 96/183; 96/193; 96/197; 96/204; 96/190; 96/155; 96/170; 209/728
(58) Field of Search ................................. 162/264, 380, 162/348; 96/190, 182–184, 193, 197, 200, 155, 170, 204, 22.15; 209/728–731

(56) References Cited

U.S. PATENT DOCUMENTS

| | | | | |
|---|---|---|---|---|
| 2,931,503 A | * | 4/1960 | Clark .......................... | 162/380 |
| 3,131,117 A | * | 4/1964 | Hickey ........................ | 162/190 |
| 3,206,917 A | * | 9/1965 | Kaiser et al. ................. | 95/248 |
| 3,421,622 A | * | 1/1969 | Wurtmann ................... | 209/731 |
| 3,432,036 A | * | 3/1969 | Kaiser ........................ | 209/729 |
| 3,720,315 A | * | 3/1973 | Kaiser ........................ | 209/728 |
| 4,219,340 A | * | 8/1980 | Kaiser ........................ | 95/266 |
| 4,419,109 A | | 12/1983 | Matula | |
| 5,308,384 A | * | 5/1994 | Kapanen et al. .............. | 95/260 |
| 6,096,120 A | * | 8/2000 | Erlund et al. ................ | 96/182 |

FOREIGN PATENT DOCUMENTS

WO    WO 97/15717 A1    5/1997

* cited by examiner

Primary Examiner—Jose Fortuna
(74) Attorney, Agent, or Firm—Alston & Bird LLP

(57) ABSTRACT

An apparatus for degassing an aqueous suspension containing pulp fibres, the apparatus comprising an elongated horizontal reservoir and a bypass manifold extending into the reservoir. The bypass manifold is placed inside the reservoir such that it it positioned substantially within the aqueous suspension at the bottom of the reservoir, the manifold thus decreasing the flow cross-sectional area of the aqueous suspension at the inlet end of the bypass manifold (2) in the reservoir.

8 Claims, 1 Drawing Sheet

APPARATUS FOR DEGASSING AN AQUEOUS SUSPENSION CONTAINING PULP FIBERS

FIELD OF THE INVENTION

The invention relates to an apparatus for degassing an aqueous suspension containing pulp fibers, the apparatus comprising an elongated horizontal reservoir, a bypass manifold that extends into the reservoir from one end thereof and that is parallel to the reservoir, several successive injection pipes originating in the bypass manifold for supplying an aqueous suspension into the reservoir beginning from the inlet end of the bypass manifold over a section of the reservoir's length, a discharge pipe situated near the opposite end of the reservoir for removing the aqueous suspension from the reservoir, means for keeping the surface of the aqueous suspension substantially at a constant level in the reservoir, and an overflow pipe for returning into circulation additional aqueous suspension that has entered the reservoir.

BACKGROUND OF THE INVENTION

In a paper machine, pulp fed into the head box and dilution water used for adjustments of the head box must be deaerated as well as possible before the aqueous suspensions are passed into the head box in a paper machine, board machine or some other similar web-forming machine. Usually, the fiber consistency of the pulp in the head box varies from 0.5 to 1.5% and the consistency of the dilution water varies from 0.2 to 0.8%, even though the values may also be different. The variation in the consistency should also be reduced, which is implemented in this kind of apparatus by spraying an aqueous suspension around the reservoir, whereupon the suspension is mixed more evenly since it consists of several separate streams. When an aqueous suspension is supplied to the reservoir via separate vertical injection pipes, the suspension gushes into the upper surface of the reservoir and flows down into the aqueous suspension contained in a basin provided in the reservoir, thus improving deaeration. The aqueous suspension flows in the longitudinal direction of the basin towards a discharge pipe provided at the opposite end of the basin with respect to the injection pipes, and the suspension is passed via the discharge pipe to the head box. Since a sub-atmospheric pressure prevails in the reservoir, air and other gases can be easily removed from the aqueous suspension due to the sub-atmospheric pressure both during the spraying and later from the surface of the suspension. In prior art arrangements, a vertical wall placed at the other end of the basin limits the surface level of the aqueous suspension such that it remains substantially constant, and possible additional aqueous suspension flows over the wall and out of the basin via a discharge pipe provided on the other side of the wall. Such arrangements are disclosed for example in Finnish Patents 63613 and 100950. There are also known arrangements where a bypass manifold extends into the reservoir from one end thereof, and injection pipes placed on the upper surface and on the sides of the manifold are used to spray an aqueous suspension into the reservoir.

In the prior arrangements, a typical problem is that the flow of the aqueous suspension in the basin provided in the reservoir varies greatly in the longitudinal direction of the reservoir. This is due to the fact that closer to the end of the reservoir the amount of the aqueous suspension is smaller with respect to the cross-sectional surface of the reservoir, which results in a relatively small flow near the end of the reservoir. Correspondingly, closer to the discharge pipe the total amount of the aqueous suspension sprayed from the injection pipes increases and the flow is the greatest at the injection pipes that are nearest to the discharge pipe. Therefore, at the end of the reservoir farthest from the discharge pipe the flow amounts may be too small, wherefore the aqueous suspension or a part thereof, such as a filler supplied thereto, may flocculate or settle at the bottom of the reservoir and its consistency may differ significantly from the average consistency of the aqueous suspension in the basin. This causes significant changes in the quality of the finished paper or in some other fiber web product, which is not in any way desirable. With a low flow rate the reservoir also gets dirty more quickly.

SUMMARY OF THE INVENTION

The purpose of the present invention is to provide an apparatus for degassing an aqueous suspension that avoids the drawbacks of the prior arrangements and provides a relatively even flow of the aqueous suspension in the basin at the bottom of the reservoir, while preventing the reservoir from getting dirty, so that flocculation, sedimentation and variation in consistencies can be minimized as well as possible. The apparatus according to the invention is characterized in that the bypass manifold is positioned at the lower part of the reservoir such that it is situated substantially within the aqueous suspension in the reservoir.

The basic idea of the invention is that a bypass manifold is placed or formed at the lower part of the reservoir towards the discharge pipe from the inlet end of the aqueous suspension, such that the manifold is situated at least primarily within the aqueous suspension wherefore it decreases the cross-sectional area of the reservoir at the inlet end and thus increases the flow rate of the aqueous suspension. Therefore, the ratio of the amount of the aqueous suspension flowing in the basin and of the cross-sectional area of the flow can be adjusted better, so that the flow rate of the aqueous suspension from the end of the reservoir to the discharge pipe can be made almost constant. According to a preferred embodiment of the invention, the bypass manifold tapers off from the end of the reservoir towards the discharge pipe, and therefore the flow of the aqueous suspension inside the manifold and correspondingly the flow in the reservoir can be adjusted, such that at each point the amount of the flowing aqueous suspension and the cross-sectional area are substantially in a constant ratio. The basic idea of another preferred embodiment of the invention is that the upper surface of the bypass manifold is substantially planar, and the injection pipes can therefore be connected thereto accurately and precisely so that the fastening comprises no unevenness or projections where fibers might accumulate, thus forming flocs or deteriorating otherwise the quality of the aqueous suspension.

The invention has an advantage that at best the flow of the aqueous suspension can be kept substantially constant along the entire length of the basin for aqueous suspension in the reservoir. Another advantage of the invention is that it is easy and simple to implement.

BRIEF DESCRIPTION OF THE DRAWINGS

The invention will be described in greater detail in the accompanying drawing, in which.

DETAILED DESCRIPTION OF THE PREFERRED EMBODIMENTS

Figure 1:
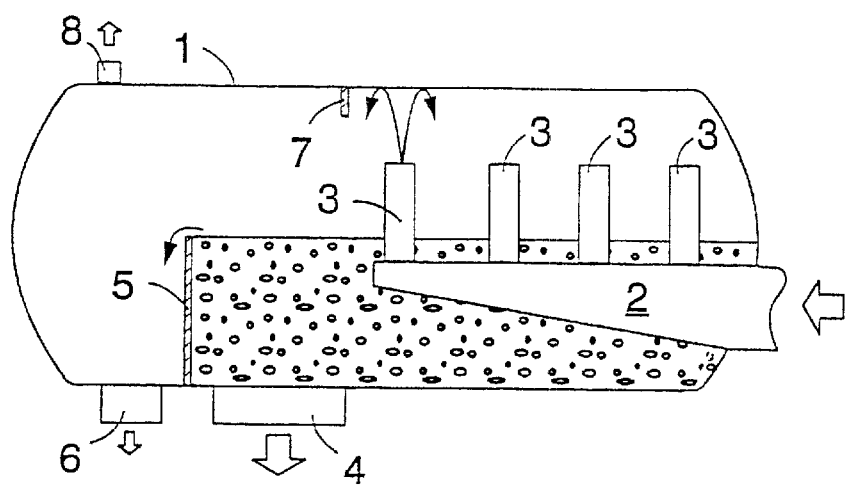
FIG. 1 is a schematic sectional view of an embodiment of the apparatus according to the invention.
Figure 2:
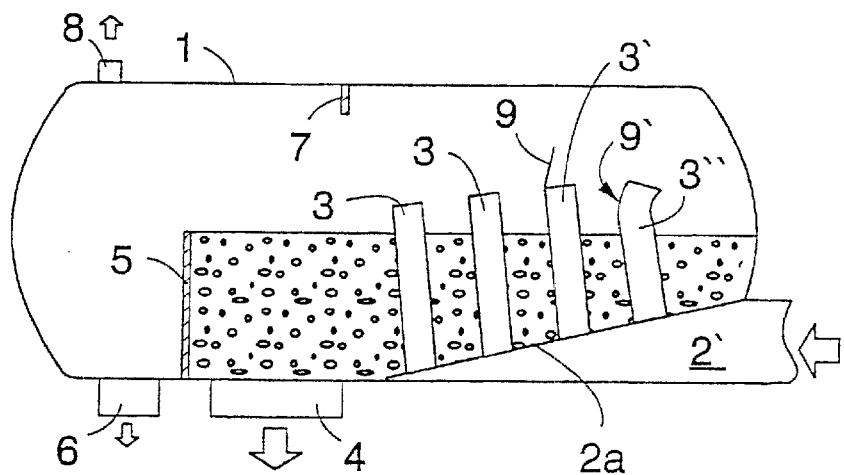
FIG. 2 is a schematic sectional view of another embodiment of the apparatus according to the invention.
Figure 3:
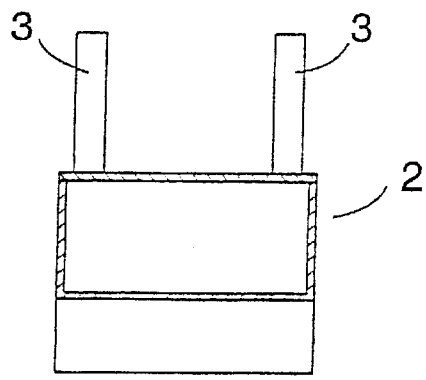
FIG. 3 shows schematically an advantageous cross-section of a bypass manifold in the apparatus according to the invention shown in FIG. 1.

In FIGS. 1 to 3, like reference numerals correspond to like parts, and the parts are not described separately later unless it is necessary in order to clarify the matter.

FIG. 1 shows an apparatus for degassing an aqueous suspension. The apparatus comprises a reservoir 1, at one end of which a bypass manifold 2 is introduced into the reservoir. At the upper surface of the bypass manifold 2 there are injection pipes 3 that point upwards. Near the opposite end of the reservoir there is a discharge pipe 4 via which an aqueous suspension that has fallen onto the bottom of the reservoir 1 is passed forward in a manner known per se to a head box not shown in the figure. At the other side of the discharge pipe 4 there is a partition wall 5 that extends across the reservoir and forms thus in the reservoir a basin for the aqueous suspension, the basin extending to the end of the reservoir near the bypass manifold 2. On the other side of the partition wall 5 near the end of the reservoir 1 there is an overflow pipe 6 via which the aqueous suspension that has flown over the partition wall 5 is discharged and returned back to the circulation of aqueous suspension. The partition wall 5 thus operates as a means for maintaining the surface of the aqueous suspension at a constant level inside the reservoir 1.

As shown in the figure, the bypass manifold 2 is placed such that it is situated under the surface of the aqueous suspension. The bypass manifold 2 thus forms a component decreasing the cross-sectional area at the inlet end of the aqueous suspension at the bottom of the reservoir 1, whereafter the flow cross-sectional area available for the aqueous suspension at this end is smaller than the flow cross-sectional area near the discharge pipe 4. Correspondingly, since the amount of the aqueous suspension sprayed from the first injection pipes near the end of the reservoir is smaller than the total amount of the sprayed aqueous suspension at the last injection pipes, the small cross-sectional area and the small amount of suspension are proportional to the corresponding large cross-sectional area and large amount of suspension. Thus, the flow rate of the aqueous suspension in the layer of aqueous suspension at the bottom of the reservoir is considerably more even than in the prior arrangements. Further, when the bypass manifold 2 is formed preferably with a decreasing cross-section as shown in the figure, the flow rate of the entire aqueous suspension in the reservoir is substantially almost constant. Therefore, at the inlet end of the aqueous suspension there will be no flocculation or concentration that could interfere with the manufacture of a fiber web or deteriorate the quality of the fiber web. In principle, the bypass manifold 2 can be positioned either substantially at the same level as the liquid surface or entirely below the liquid surface. The figure further shows a stop plate 7 positioned at the upper surface of the reservoir 1 between the injection pipes 3 and the discharge pipe 4, the plate restricting the gushing of the aqueous suspension sprayed from the injection pipes towards the discharge pipe and over the partition wall 5. There may be one or several of such stop plates 7 of optionally different sizes and shapes at different points of the reservoir's inner surface. There may be, in turn, one or several parallel injection pipes 3 in the bypass manifold 2, placed in a desired manner with respect to each other in the transverse direction of the manifold. If there are two or more parallel injection pipes, for example the outermost pipes can be inclined towards the sides of the reservoir in the transverse direction thereof, if desired. It is also possible to place all the injection pipes suitably in an inclined position. At the upper part of the reservoir 1 at the end near the discharge pipe 4 there is a connection 8 via which air can be sucked out of the reservoir 1 with a vacuum pump, so that the pressure in the reservoir is lower than the atmospheric pressure, whereupon air or gas contained in the aqueous suspension can be removed therefrom as effectively as possible.

FIG. 2 shows an embodiment of the invention that corresponds otherwise to FIG. 1, but in the embodiment of FIG. 2 the bypass manifold is formed by fastening to the inner surface of the reservoir 1 a plate that extends from one end of the reservoir towards the discharge pipe 4 and that is inclined towards the pipe. The bypass manifold 2' is thus formed, on the one hand, of the casing of the reservoir 1 and, on the other hand, of the plate 2a, wherefore the bypass manifold is not a separate unit. The injection pipes 3, in turn, are fastened to the plate 2a such that they spray the aqueous suspension substantially upwards to the upper surface of the reservoir. If desired, the injection pipes 3 may comprise means for directing the aqueous suspension either in some or in all of the injection pipes 3 such that the suspension gushes towards the end of the reservoir 1 and towards the inlet end of the aqueous suspension. By way of example, this can be implemented by using either separate guide plates 9, as shown in injection pipes 3', or by bending some of the injection pipes from their upper ends or along their entire length, such that the ends point either directly upwards or in a slightly inclined position towards the end of the reservoir 1, as shown in injection pipes 3". In this embodiment, the plates for directing the spray of aqueous suspension comprise at least a bent section 9' of an injection pipe, forming a part of the pipe's length. The distribution of the aqueous suspension can thus be controlled in a desired manner, and the flow rate of the aqueous suspension can be made substantially or almost constant over the entire length of flow of the aqueous suspension. Such means for directing the spray of aqueous suspension can also be positioned such that they direct the spray either partly or in full towards the sides of the reservoir.

FIG. 3 shows schematically a preferred cross-section of a bypass manifold of the embodiment shown in FIG. 1. In this embodiment, the bypass manifold is formed in principle rectangular. It can be made simply by first bending a lower part with a U-shaped cross-section, the wall height of this part changing in accordance with the length thereof. The next step is to fasten to the lower part, usually for example by welding, an upper surface which is provided with suitable mounting holes for bypass manifolds 3, such that the manifolds can be connected to the upper surface either before it is attached to the lower part or thereafter. In principle, the bypass manifold can naturally also be bent from a single plate-like piece, and the last seam can be closed by welding, whereafter the injection pipes are fastened to the bypass manifold correspondingly in a suitable manner.

The invention is disclosed above in the specification and in the drawings by way of example and it is not restricted thereto in any way. The cross-section of the bypass manifold may be of any suitable shape, such as an ellipse, a cone or the like, as long as the bypass manifold is placed below the surface of the aqueous suspension. The degassing apparatus according to the invention can be used similarly to degas for example dilution water used for profile adjustments of the head box, even though this embodiment may require a considerably smaller number of injection pipes and also a smaller reservoir volume. The means for directing an aqueous suspension shown in FIG. 2 are suitable for use similarly in the embodiment shown in FIG. 1. Further, the means for keeping the surface of the aqueous suspension at a constant level may also be some other device or arrangement known per se for adjusting the surface level suitably, in addition to a simple partition wall and an overflow pipe.

What is claimed is:

1. An apparatus for degassing an aqueous suspension containing pulp fibers, the apparatus comprising:
   an elongate horizontal reservoir defining opposed ends;
   a bypass manifold that extends into the reservoir in a direction extending between the ends of the reservoir, wherein the bypass manifold is formed such that its cross-section decreases from one end towards the opposite end of the reservoir;
   one or more successive injection pipes for supplying an aqueous suspension into the reservoir, said pipes originating in the bypass manifold between an inlet end and an opposite end of the bypass manifold;
   a discharge pipe connected to the reservoir for removing degassed aqueous suspension from the reservoir;
   means for keeping the surface of the aqueous suspension substantially at a predetermined horizontal level in the reservoir; and
   an overflow pipe for removing aqueous suspension not removed by said discharge pipe;
   wherein the bypass manifold is positioned in the reservoir such that the bypass manifold is situated at least partly below the level of the aqueous suspension in the reservoir.

2. An apparatus according to claim 1 wherein the bypass manifold is situated wholly below the level of the aqueous suspension.

3. An apparatus according to claim 1 wherein the bypass manifold is formed with an upper surface that is substantially planar and further wherein the injection pipes are fastened to said upper surface of the bypass manifold.

4. An apparatus according to claim 1 wherein the bypass manifold is formed as a separate pipe extending into the reservoir from the end thereof.

5. An apparatus according to claim 1 wherein the bypass manifold further comprises a:plate that extends downwards from one end of the reservoir towards the bottom of the reservoir, the plate defining edges that are fastened to the inner surface of the reservoir.

6. An apparatus according to claim 1 wherein at least some of the injection pipes are structured for directing a spray of aqueous suspension at an angle towards an end of the reservoir.

7. An apparatus according to claim 6 wherein at least one of the pipes is structured with a bent section forming a part of the length of the pipe.

8. An apparatus according to claim 6 further comprising one or more guide plates placed at an outlet end of one of the injection pipes.

* * * * *